(12) United States Patent
Nakashita et al.

(10) Patent No.: US 7,362,451 B2
(45) Date of Patent: Apr. 22, 2008

(54) SENSOR DEVICE

(75) Inventors: Naoya Nakashita, Ayabe (JP); Koji Shimada, Fukuchiyama (JP); Yoshinori Kawai, Ayabe (JP); Masahiro Kawachi, Kyotanabe (JP)

(73) Assignee: Omron Corporation, Kyoto-Shi (JP)

( * ) Notice: Subject to any disclaimer, the term of this patent is extended or adjusted under 35 U.S.C. 154(b) by 233 days.

(21) Appl. No.: 11/079,015

(22) Filed: Mar. 14, 2005

(65) Prior Publication Data
US 2005/0213112 A1 Sep. 29, 2005

(30) Foreign Application Priority Data
Mar. 15, 2004 (JP) .............................. 2004-072198

(51) Int. Cl.
G01B 11/14 (2006.01)
(52) U.S. Cl. ..................................... 356/614; 356/3.07
(58) Field of Classification Search ........ 356/614–625, 356/3.01–3.09, 3.1–3.12; 250/559.38, 201.2
See application file for complete search history.

(56) References Cited
U.S. PATENT DOCUMENTS
2002/0154318 A1* 10/2002 Matsunaga et al. ......... 356/623

FOREIGN PATENT DOCUMENTS
WO   WO 01/57471 A1   8/2001

\* cited by examiner

Primary Examiner—Gregory J. Toatley, Jr.
Assistant Examiner—Tri Ton
(74) Attorney, Agent, or Firm—Foley & Lardner LLP

(57) ABSTRACT

To provide a displacement sensor device capable of fast data read-out processing. A sensor device includes: a light-emitting element for irradiating an object to be measured with light at a prescribed angle; an image pickup element for shooting the light-irradiated object to be measured at another angle; a normal measurement area setting device capable of setting a normal measurement area in the visual field of the image pickup element; a receiving-light signal detecting device for detecting a receiving-light signal distribution area of the object to be measured from the set normal measurement area; a following-type measurement area setting device for setting at least one following-type measurement area which includes the detected receiving-light signal distribution area and is narrower than the normal measurement area; a displacement measuring device for measuring a target displacement by measuring the following-type measurement area; and an output device for outputting the measured displacement.

20 Claims, 16 Drawing Sheets

SENSOR DEVICE

BACKGROUND OF THE INVENTION

1. Field of the Invention

The present invention relates to a sensor device capable of reducing measurement processing time.

2. Description of the Related Art

There are conventionally known sensor devices for measuring displacements, lengths, angles and the like of a variety of objects to be measured. For example, a conventional displacement sensor device comprises: a light-transmitting portion for irradiating an object to be measured with slit light by driving a light-transmitting element such as a laser diode; a light-receiving portion for receiving the slit light having been transmitted from the light-transmitting portion and reflected by the object to be measured; a calculating means for calculating a distance to the object to be measured; and an outputting means for outputting the distance to the object to be measured which was calculated by the calculating means (see e.g., International Publication pamphlet No. 01/57471).

The case is assumed, as shown in FIG. 15, that objects [1], [2] and [3] to be measured are conveyed along a line (from the right to the left in the figure), a sensor head portion 1501 of a displacement sensor device irradiates each of the objects to be measured with slit light in a vertical direction to the direction of conveying the objects to be measured (or the up and down direction in the figure) and then receives the light reflected by each of the objects to be measured. In FIG. 15, when it is considered that the object [1] to be measured is arranged in a standard position on the line, the object [2] to be measured is considered to be arranged on a closer side to the sensor head portion 1501 while the object [3] to be measured is considered to be arranged on a farther side to the sensor head portion 1501. As thus described, there are some cases where variations occur in arrangement of objects to be measured on a line.

As shown in FIG. 16, in a rectangular visual field Z (light-receiving face) of a two-dimensional image pickup element built in the sensor head portion 1501, irradiated-light images [1], [2] and [3] are arranged to correspond to the objects to be measured. In the figure, the left side is closer, whereas the right side is farther, to the sensor head portion 1501. While a horizontal line (in a displacement measuring direction) has been set along the longitudinal direction of the rectangular visual field Z, a vertical line (in an extending direction of the irradiated-light images) orthogonal to the set horizontal line has been allocated. In this case, a rectangular measurement area surrounded with a broken line is set as a normal measurement area so as to measure the irradiated-light images [1], [2] and [3].

When the variation area A shown in FIG. 15 is wide, the measurement area widens, or it becomes necessary to previously widen the measurement area shown in FIG. 16 to correspond to the variation area A. There is therefore a disadvantage that the wider the measurement area is, the longer the time required for reading out data is.

The present invention was made focusing attention on such a conventional problem, and has an object to provide a sensor device capable of reading out and arithmetically processing data at high speed.

Still another object, as well as action effect, of the present invention would be readily understood by a skilled person in the art by referring to the following description.

SUMMARY OF THE INVENTION

A sensor device of the present invention comprises: a light-transmitting element for irradiating an object to be measured with light at a prescribed angle; an image pickup element for shooting the light-irradiated object to be measured at another angle; a normal measurement area setting means capable of setting a normal measurement area in the visual field of the image pickup element; an irradiated-light image position detecting means for detecting a position of a light-irradiated image in the visual field of the image pickup element by scanning the set normal measurement area; a following-type measurement area setting means for setting at least one following-type measurement area which includes the position of the detected irradiated-light image, and is narrower than the normal measurement area in a displacement measuring direction; a displacement measuring means for measuring a target displacement by measuring the following-type measurement area; and an output means for outputting the measured displacement.

Herein, the displacement measuring direction refers to a direction in which the position of the irradiated-light image detected by a displacement of the object to be measured is changed.

According to such a constitution, the normal measurement area is used for detecting an irradiated-light image corresponding to an object to be measured, and a target displacement is not measured here. On the other hand, the following-type measurement area which includes the position of the detected irradiated-light image and is narrower than the normal measurement area in a displacement measuring direction, is used for measuring the target displacement. Since this allows setting of a narrower measurement area for reading out data than that in the conventional sensor device, it is possible to read out and arithmetically processing data at high speed.

In an embodiment of the present invention, the irradiated-light image position detecting means may perform a thinning-out measurement of data arranged at prescribed intervals in a direction of measuring a displacement of the image pickup element, to measure a concentration distribution light-receiving signals in the displacement measuring direction in the visual field of the image pickup element, thereby detecting the position of the irradiated-light image based upon the measured concentration distribution.

According to such a constitution, since the number of items to be measured for detecting the position of the irradiated-light image can be reduced, even faster processing is possible.

In the embodiment of the present invention, the light-transmitting element may irradiate slit light, the image pickup element may be a two-dimensional image pickup element, and the irradiated-light image position detecting means may measure the concentration distribution of the light-receiving signals on at least one line in the displacement measuring direction in the visual field of the image pickup element, thereby detecting the position of the irradiated-light image based upon the measured concentration distribution.

In such an arrangement, since the concentration distribution of the light-receiving signals on one or more lines in the disposition measuring direction is measured, the light-receiving signal distribution area is detected from the normal measurement area based upon the concentration distribution. It is thereby possible to accurately detect the position of the irradiated-light image.

In the embodiment of the present invention, either an all-line measurement may be performed of all data arranged in the displacement measuring direction in the measurement area, or the thinning-out measurement may be performed of data arranged at prescribed intervals in the displacement measuring direction, thereby measuring the concentration distribution. According to such a constitution, since the position of the irradiated-light image can be determined with high precision by the all-line measurement, it is possible to prevent erroneous detection. Further, in the case of performing the thinning-out measurement, it is possible to read out and process data at high speed.

In the embodiment of the present invention, the irradiated-light image position detecting means performs either the all-line measurement or the thinning-out measurement of the concentration distribution of the light-receiving element signals in the displacement measuring direction in an area other than the normal measurement in the visual field of the image pickup element when an irradiated-light image is not detected in the normal measurement.

Further, in the embodiment of the present invention, the light-transmitting element may irradiate slit light, the image pickup element may be a two-dimensional image pickup element, and the irradiated-light image position detecting means may perform either the all-line measurement or the thinning-out measurement of the concentration distribution of the light-receiving element signals on at least one line in the displacement measuring direction in an area other than the normal measurement in the visual field of the two-dimensional image pickup element when an irradiated-light image is not detected in the normal measurement area. According to such a constitution, even when the position of the irradiated-light image cannot be detected at once, the area other than the normal measurement area is measured, and it is thereby possible to prevent erroneous detection due to failure to detect the position of the irradiated-light image.

In the embodiment of the present invention, the object to be measured may be a transparent body, two following-type measurement areas may be provided corresponding to the front face and rear face of the transparent body, and measurement may be performed while the two following-type areas are switched to one another. According to such a constitution, it is possible to measure the front and rear faces of the transparent body with high accuracy.

In the embodiment of the present invention, the thinning-out measurement may be performed of data arranged at prescribed intervals in the displacement measuring direction, connecting irradiated-light images arranged on the two following-type measurement area, thereby measuring a thickness of the transparent body. According to such a constitution, it is possible to measure the thickness of the transparent body at high speed.

In the embodiment of the present invention, the image pickup element may be constituted of any of a photodiode array, a CCD and a CMOS image pickup element. The image pickup element includes a one-dimensional image pickup element and a two-dimensional image pickup element.

The image pickup element may be constituted by the CMOS image pickup element, and the irradiated-light image position detecting means may be allowed to directly read out, from the CMOS image pickup element, pixel data of the set normal measurement data and following-type measurement area. In this arrangement, the number of images to be read out from the CMOS image pickup element can be reduced, and thereby high-speed processing is possible.

In the present embodiment, the sensor device may be constituted as a displacement sensor, a length measuring sensor, and an angle sensor.

As apparent from the above description, according to the present invention, the measurement area where data is read out can be set narrower by narrowing the measurement area of the irradiated-light image from the normal measurement area down to the following-type measurement area, and thereby data can be read out and processed at high speed. Therefore, the present invention has an advantage of being able to perform measurement where even an object to be measured that is conveyed while meandering along the line can be followed.

DESCRIPTION OF THE PREFERRED EMBODIMENTS

In the following, a preferred mode of the sensor device of this invention is specifically described by reference to attached drawings. It should be noted that an embodiment below described is merely one of examples of the present invention. The substance of the present invention is restricted only by what are recited in the claims.

A displacement sensor of the present embodiment is a so-called amplifier separate type displacement sensor constituted by separating a signal processing portion and a sensor head portion from one another, in order to compactly house the sensor into a control plate or the like and also facilitate installment of the sensor in a narrow measurement environment.

Figure 1:
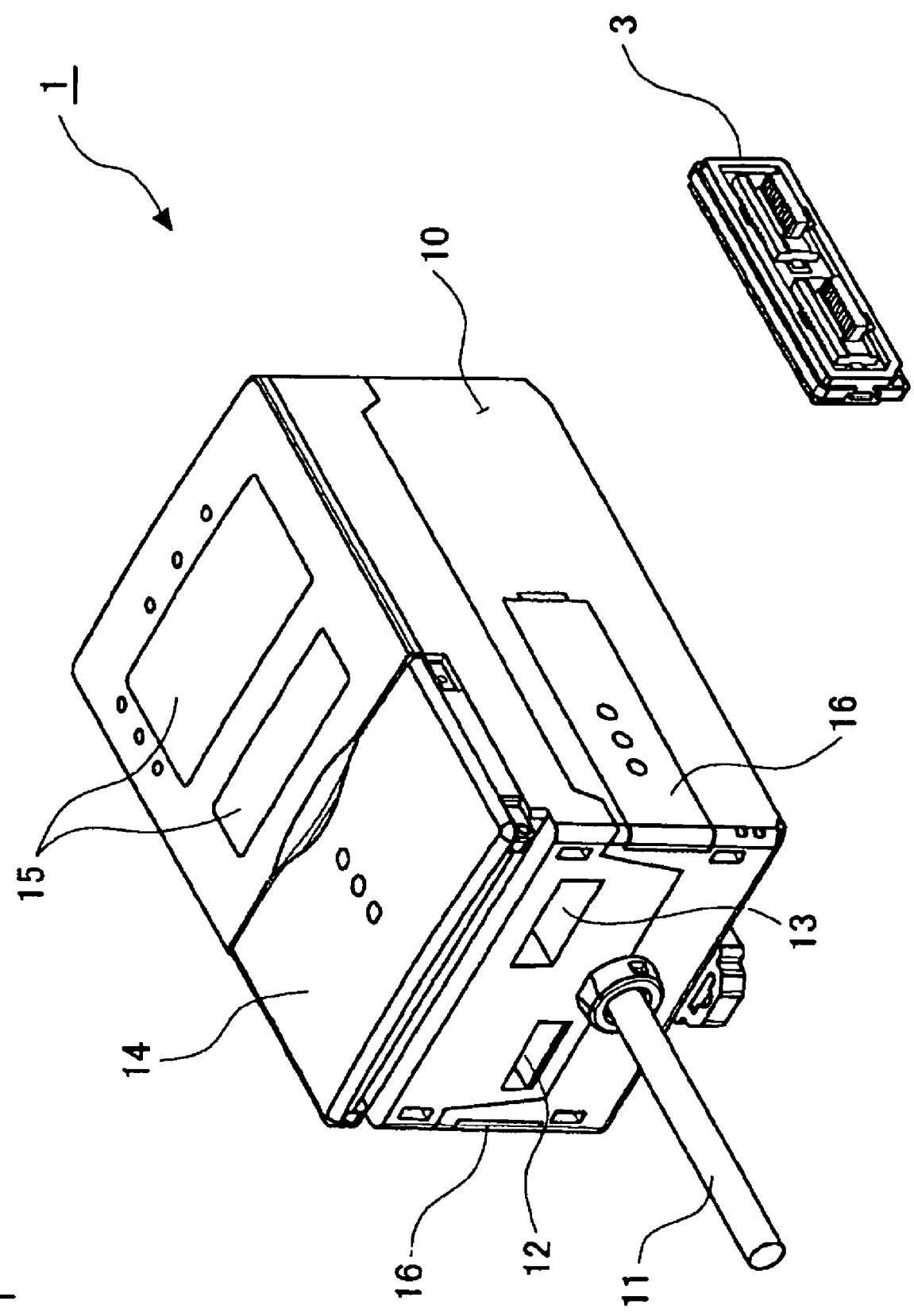
FIG. 1 shows an external oblique view of a signal processing portion.

FIG. 1 shows an external oblique view of the signal processing portion of the displacement sensor in the present embodiment. A housing case 10 of the signal processing portion 1 has a slightly narrow rectangular parallelepiped shape. From the top of the housing case 10, an external connecting code 11 has been pulled out. This external connecting code 11 includes an input line, an external output line, a power source line, and the like. The external input line for example commands various commands from the outside, from a PLC or the like as a high-level device to the signal processing portion 1. The external output line outputs a switching output, an analog output, and the like, produced inside the signal processing portion 1 to the PLC and the like. The power source line supplies a power source for an internal circuit of the signal processing portion. Further, the front face of the housing case 10 is provided with a USB connector 12 and an RS-232C connector 13.

The upper face of the housing case 10 is provided with an openable and closable operating-portion cover 14. Although not shown in the figure, an operating portion is provided under the cover 14, for performing various instructed operations in the signal processing portion 1. Further, on the upper face of the housing case 10, a display portion 15 is arranged for displaying an action and the like.

On each of the right and left side faces of the housing case 10, an inter-signal-processing-portion connector cover 16 is provided. In this inter-signal-processing-portion connector cover 16, an inter-signal-processing-portion connector (intermediary connector 3) for connecting with another signal processing portion 1 is provided.

Figure 2:
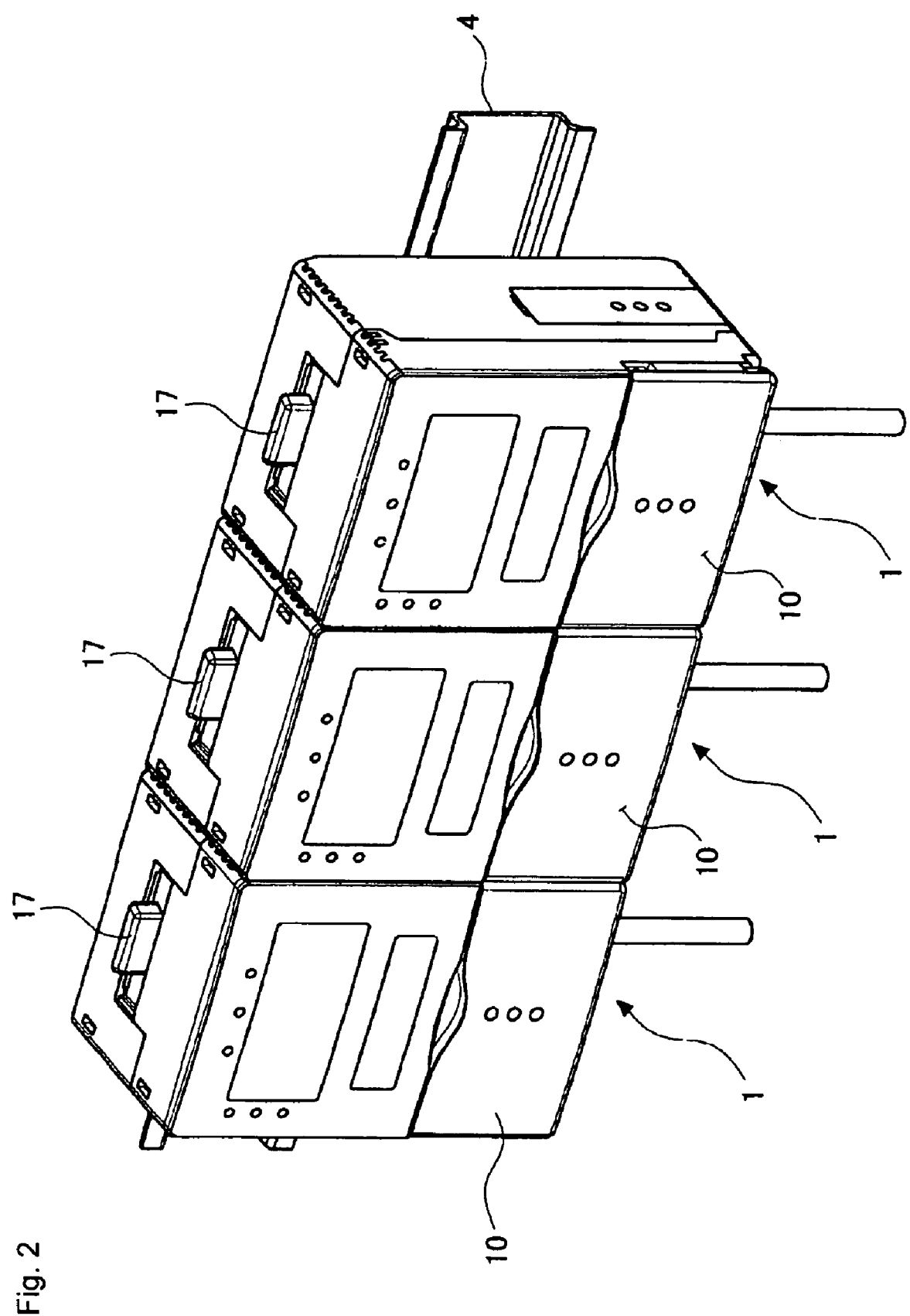
FIG. 2 shows an external oblique view of the signal processing portions in a connected state.

FIG. 2 shows an external oblique view of a plurality of signal processing portions 1 in a connected state. In this example, as shown in this figure, a plurality of signal processing portions 1 are adjacent-connected in a line through a DIN rail 4. A connector 17 for connecting with the sensor head portion is provided on the back face of the housing case 10 of the signal processing portion 1. The signal processing portions 1 are connected to a below-mentioned sensor head portion 2 through the connectors 17 for connecting with the sensor head portion.

Figure 3:
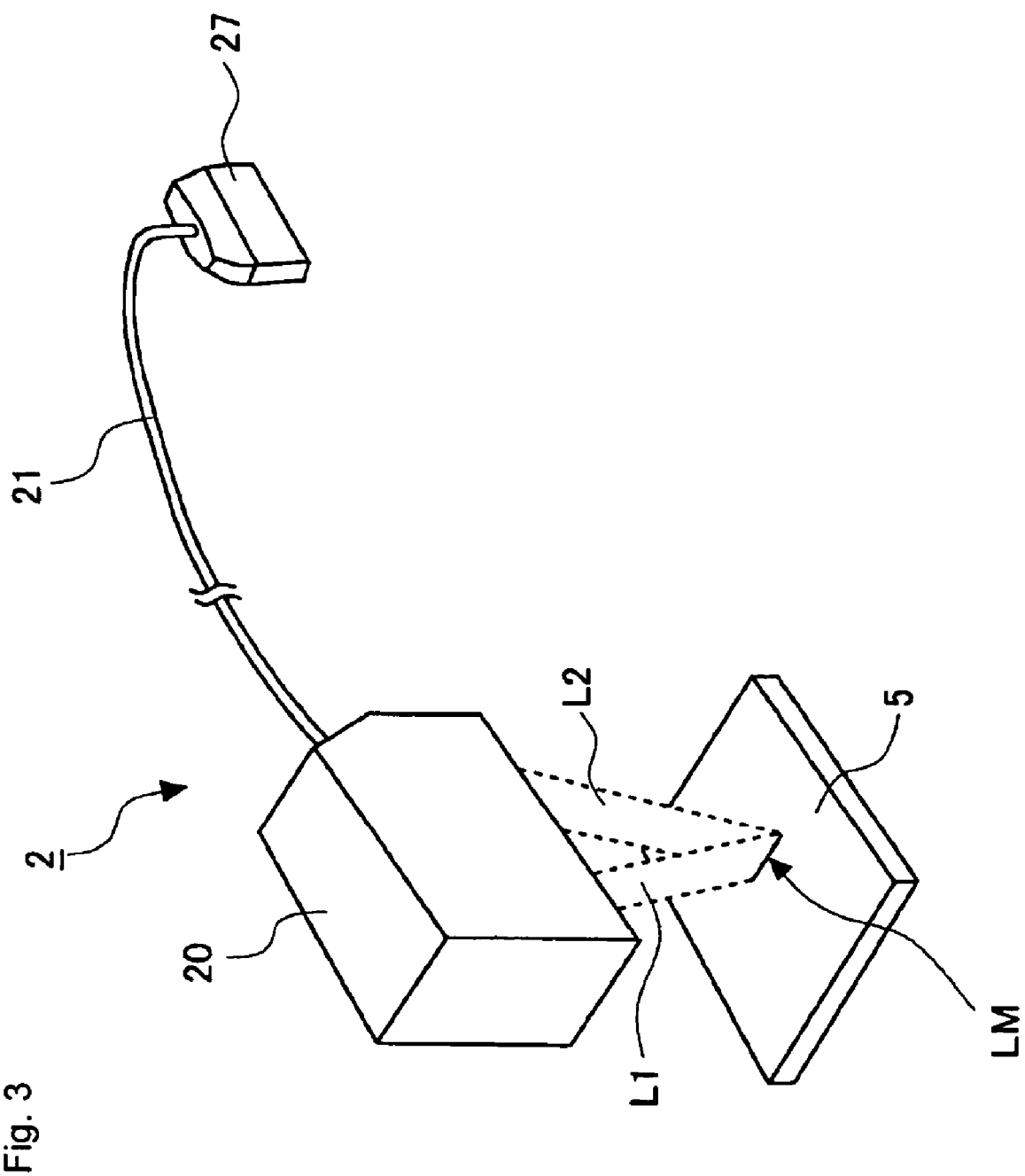
FIG. 3 shows an external oblique view of a sensor head portion.

FIG. 3 shows an external oblique view of the sensor head portion. The sensor head portion 2 comprises a connector 27 for connecting with the signal processing portion corresponding to the connector 17 for connecting with the sensor head portion, a cable 21, and a sensor head body 20. A pulse-like laser light (pulse light) transmitted from a light-transmitting element (laser diode) built in the body 20 is irradiated to the surface of an object 5 to be measured as slit light L1 through a light-transmitting lens not shown in the figure. By this irradiation, an irradiated-light image LM of the slit light L1 is formed on the surface of the object 5 to be measured. Reflected light L2 as the slit light reflected by the object 5 to be measured is incident on a two-dimensional image pickup element (photodiode array, CCD, CMOS image pickup element, etc.) in the sensor head portion 2 through a light-receiving lens not shown in the figure. Namely, the surface of the object 5 to be measured is shot at another angle by the two-dimensional image pickup element, to aquire an image signal including the irradiated-light image LM of the slit light. Based upon this image signal, a prescribed characteristic quantity is extracted, and thereby a target displacement quantity (in this example, a distance between the sensor head portion 2 and the object 5 to be measured) can be obtained.

It is to be noted that, although the slit light is irradiated and the two-dimensional image pickup element is used for acquiring the irradiated-light image in this example, a method is not restricted to this. It is also possible to merely irradiate condensed light and then acquire an irradiated-light image by a one-dimensional image pickup element to measure a displacement.

Figure 4:
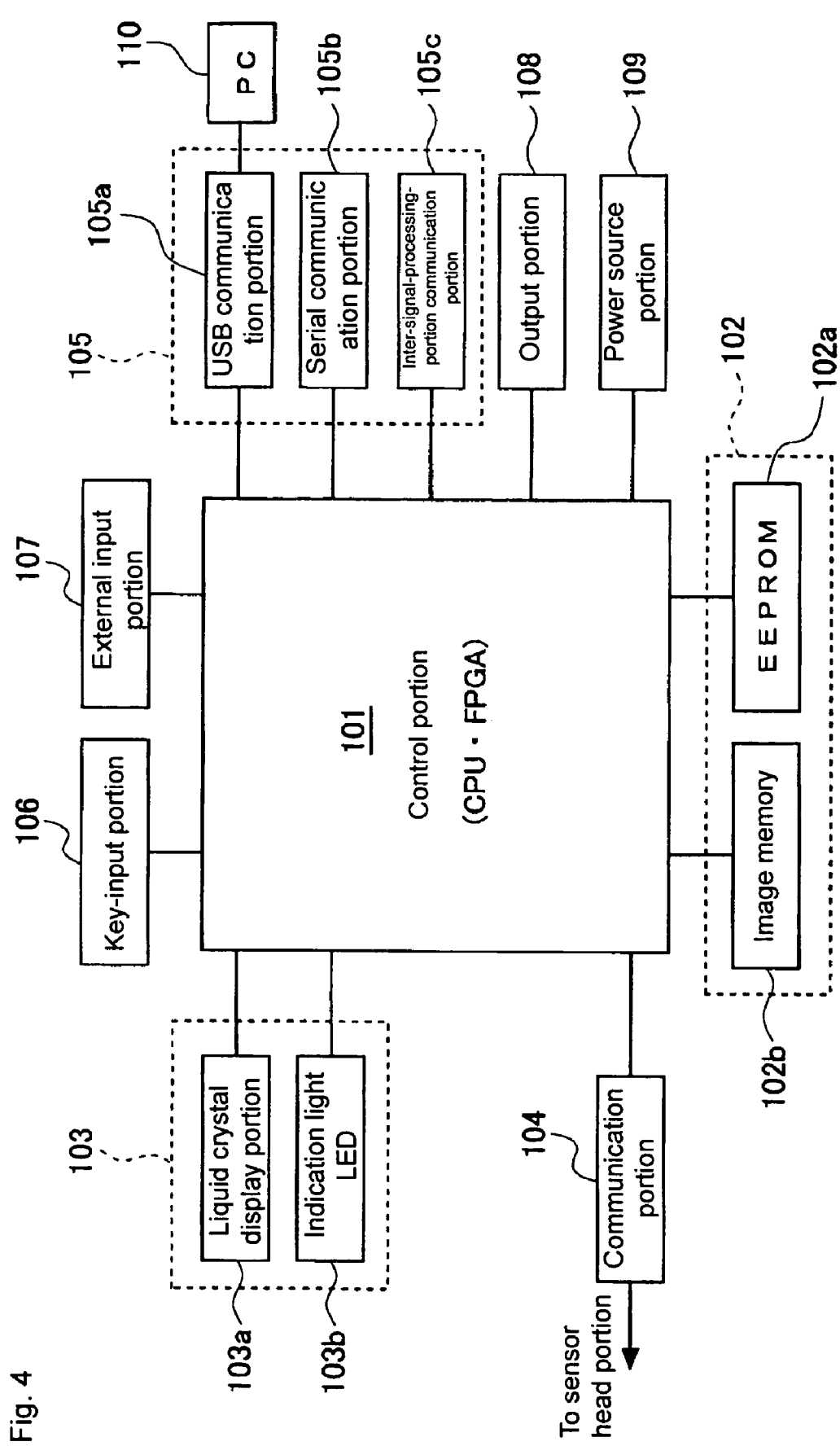
FIG. 4 shows a block diagram representing an electric hardware constitution of the signal processing portion.

FIG. 4 shows a block diagram representing the entire electric hardware constitution of the signal processing portion 1 of the displacement sensor. As shown in this figure, the signal processing portion 1 comprises a control portion 101, a storage portion 102, a display portion 103, a communication portion 104 for communicating with the sensor head portion, a communication portion 105 for communicating with external equipment, a key-input portion 106, an external input portion 107, an output portion 108, and a power source portion 109.

The control portion 101 constitutes a normal measurement area setting means, an irradiated-light image position detecting means, a following-type measurement area setting means, and a disposition measuring means. The control portion 101 is constituted of a CPU (Central Processing Unit) and FPGA (Field Programmable Gate Array), and serves to integrally control the entire signal processing portion 1. The control portion 101 realizes later-mentioned various functions, and also binarizes the light-receiving signal with reference to a prescribed threshold value and then outputs the binarized value as an output data from the output portion 108 to the outside.

The storage portion 102 comprises a nonvolatile memory (EEPROM) 102a and an image memory 102b for storing image data displayed in the display portion 103.

The display portion 103 comprises a liquid crystal display portion 103a displaying a threshold value, various values according to distance to the object to be measured or the like; and an indication light LED 103b displaying an on/off state or the like, which is a target output.

The communication portion 104 serves to communicate with the sensor head portion 2.

The external communication portion 105 comprises a USB communication portion 105a for connecting with an external personal computer (PC), a serial communication portion 105b to be used for transmitting and receiving a command or data, and an inter-signal-processing-portion communication portion 105c for performing data communication with other signal processing portions adjacent to the right and the left by following a prescribed protocol and a transmit/receive format.

The key-input portion 106 is constituted of switches for various setting, an operating button and the like, which are not shown in the figure. The external input portion 107 for example receives various commands from the upper-level device such as the PLC to the signal processing portion 1. The output portion 108 is used for outputting a target on/off output to an upper-level device such as the PLC. The power source portion 109 supplies an electric power to the control portion 101 as well as the external hardware circuit.

Figure 5:
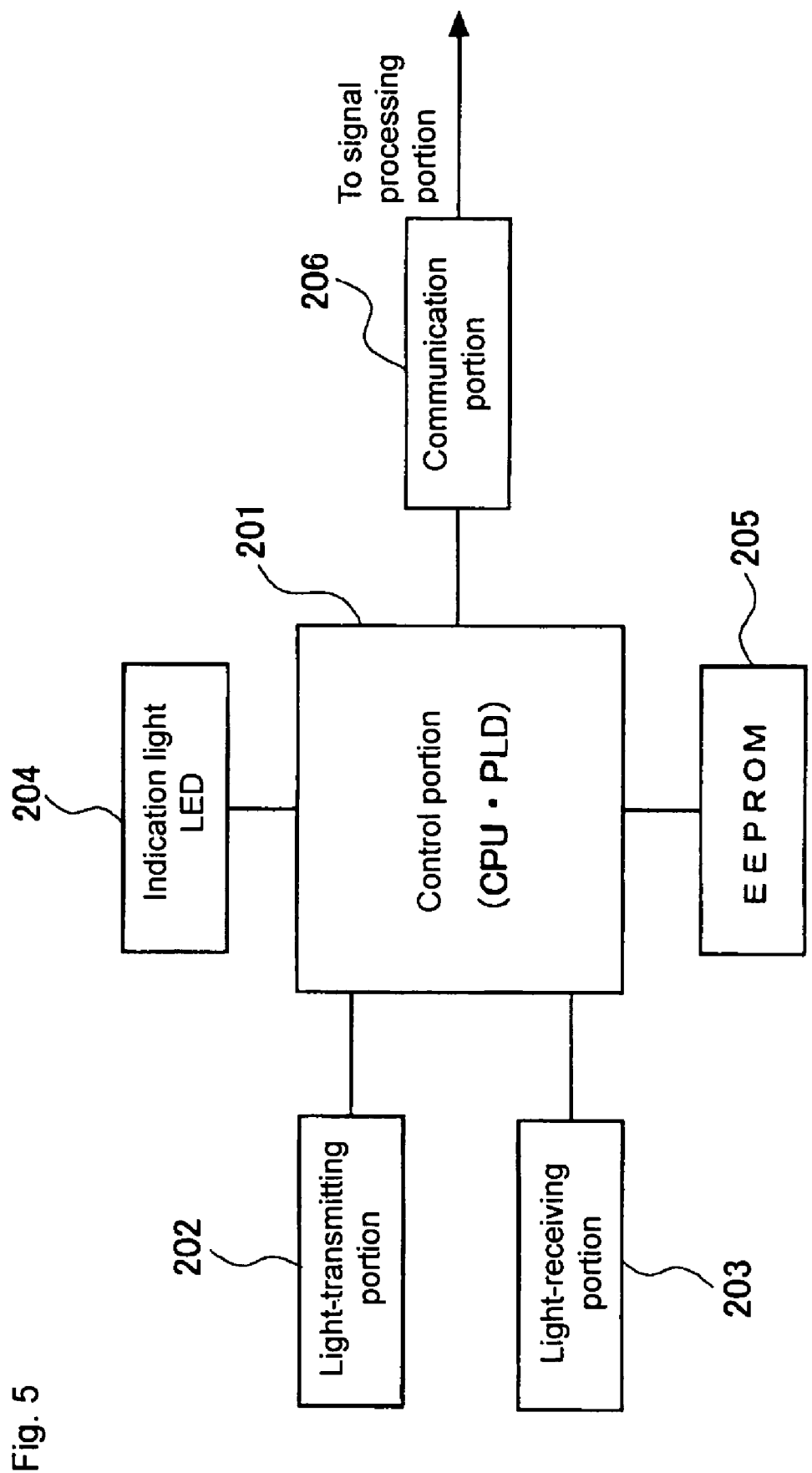
FIG. 5 shows a block diagram representing an electric hardware constitution of the sensor head portion.

FIG. 5 shows a block diagram representing an electric hardware constitution of the sensor head portion 2. As shown in this figure, the sensor head portion 2 comprises a control portion 201, a light-transmitting portion 202 for irradiating the object 5 to be measured with slit light, a light-receiving portion 203 for receiving the slit light coming after being reflected by the object 5 to be measured, an indication light LED 204, a storage portion 205, and a communication portion 206.

The control portion 201 is constituted of a CPU (Central Processing Unit) and PLD (Programmable Logic Device), and serves to integrally control the constituents 202 to 206 of the sensor head portion while taking out a light-receiving signal from the light-receiving portion 203 and sending out the signal to the signal processing portion 1.

The light-transmitting portion 202 in this example comprises a laser diode as a light-transmitting element and a light-transmitting circuit, and irradiates an area to be measured with slit light. The light-receiving portion 203 comprises a two-dimensional image pickup element (photodiode array, CCD, CMOS image pickup element, etc.) for receiving the reflected slit light, and a light-receiving signal processing portion for amplifying a light-receiving signal acquired from the two-dimensional image pickup element, synchronized with a timing control signal from the control portion 201, and outputting the amplified signal to the control portion 201. The indication light LED 204 is turned on and off corresponding to various action states of the sensor head portion 2.

The storage portion 205 is for example constituted of a nonvolatile memory (EEPROM), and in this example, records ID (identification information) and the like for identifying the sensor head portion 2. The communication portion 206 serves to communicate with the signal processing portion 1 following a command from the control portion 201.

The sensor head portion 2 of the present embodiment has a circuit configuration as above described, and performs an appropriate light-transmitting/receiving process according to a command from the signal processing portion 1.

Figure 6:
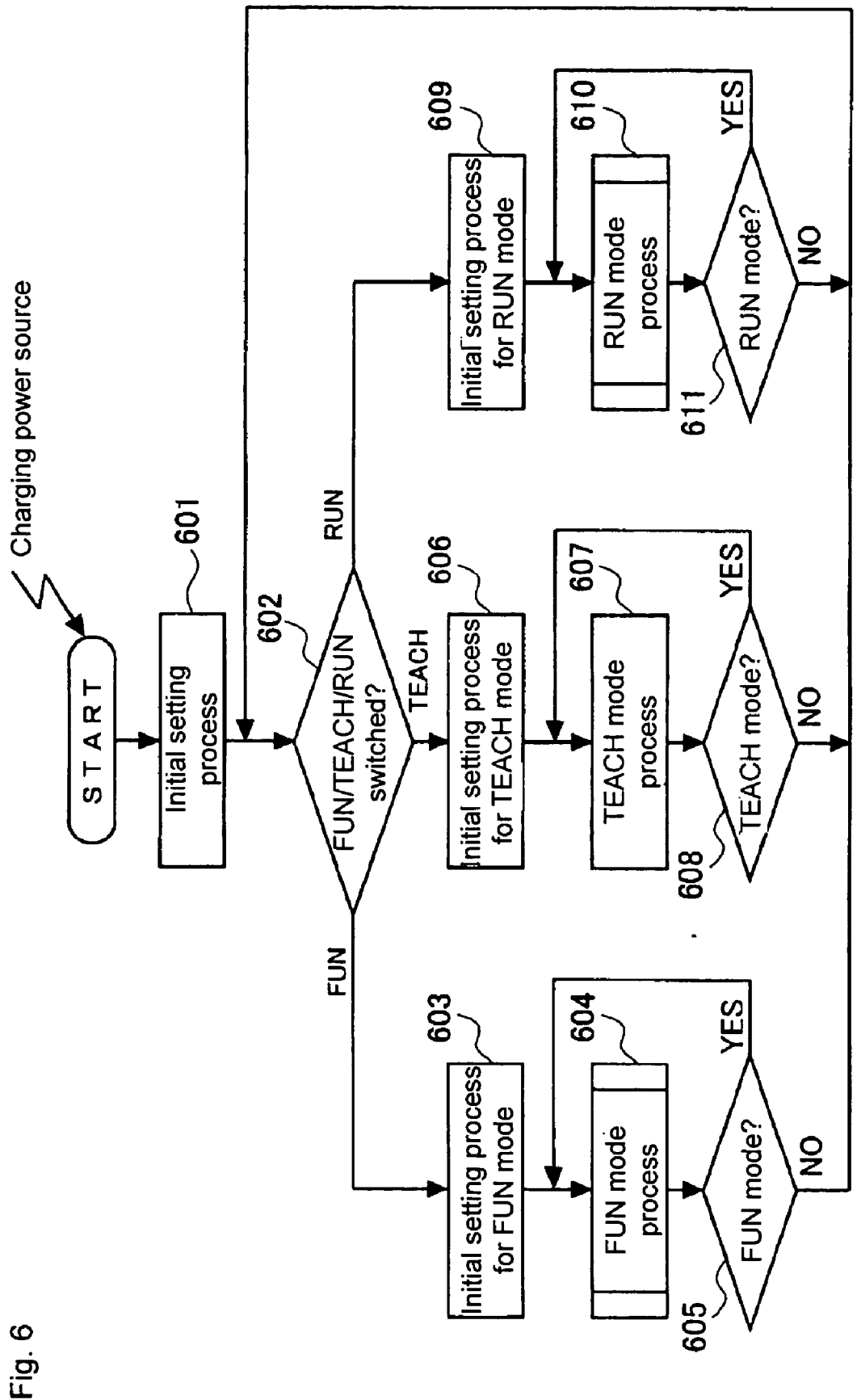
FIG. 6 shows a general flowchart representing the actions of the signal processing portion.

FIG. 6 shows a general flowchart representing the actions of the signal processing portion 1 of the displacement sensor in the present embodiment. Upon start of the process by charging a power source, an initial setting process such as an initial process is performed (Step 601), and thereafter a set mode is read. Specifically, it is determined to which one of a FUN mode, a TEACH mode and a RUN mode, switching has been taken place (Step 602).

When the set mode is the "FUN mode", after an initial setting process for the FUN mode has been performed (Step 603), a below-mentioned FUN mode process is performed (Step 604). Following Step 604, it is determined whether the FUN mode is continuing or not (Step 605). Namely, when the FUN mode is switched to another set mode, the process is returned to Step 602, whereas when it is not switched, the process is returned to Step 604.

When the set mode is the "TEACH mode", after an initial setting process for the TEACH mode has been performed (Step 606), a so-called teaching process is performed in which various set values are automatically read (Step 607). Following Step 607, it is determined whether the TEACH mode is continuing or not (Step 608). Namely, when the TEACH mode is switched to another set mode, the process is returned to Step 602, whereas when it is not switched, the process is returned to Step 607.

When the set mode is the "RUN mode", after an initial setting process for the RUN mode has been performed (Step 609), a below-mentioned RUN mode process is performed (Step 610). Following Step 610, it is determined whether the RUN mode is continuing or not (Step 611). Namely, when the RUN mode is switched to another set mode, the process is returned to Step 602, whereas when it is not switched, the process is returned to Step 610.

Figure 7:
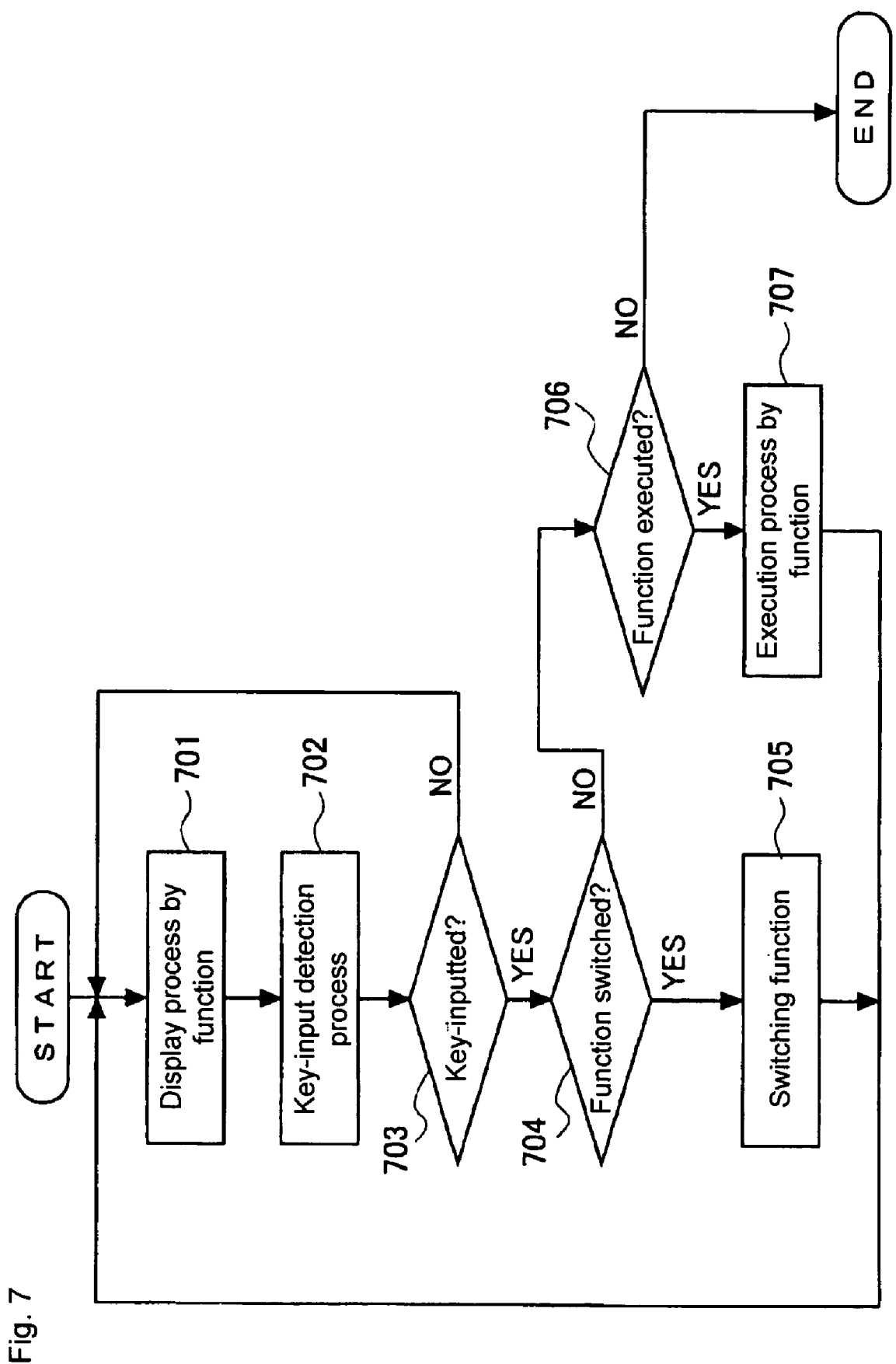
FIG. 7 shows a flowchart specifically representing a FUN mode process.

FIG. 7 shows a flowchart specifically representing a FUN mode process (Step 604). The FUN (Function) mode process is displayed by function in the display portion 15 (Step 701). Simultaneously with this, whether there has been a key-input or not (operation of an operating portion under the operating-portion cover 14) is constantly detected (Step 702). When a prescribed key-input is detected (Step 703: Yes), it is confirmed whether the detected key-input instructs to switch a function (Step 704: YES) or it instructs to execute a function (Step 706: YES). In the former case (Step 704: YES), the function is switched (Step 705). On the other hand, in the latter case (Step 706: YES), the function execution process is performed.

Figure 8:
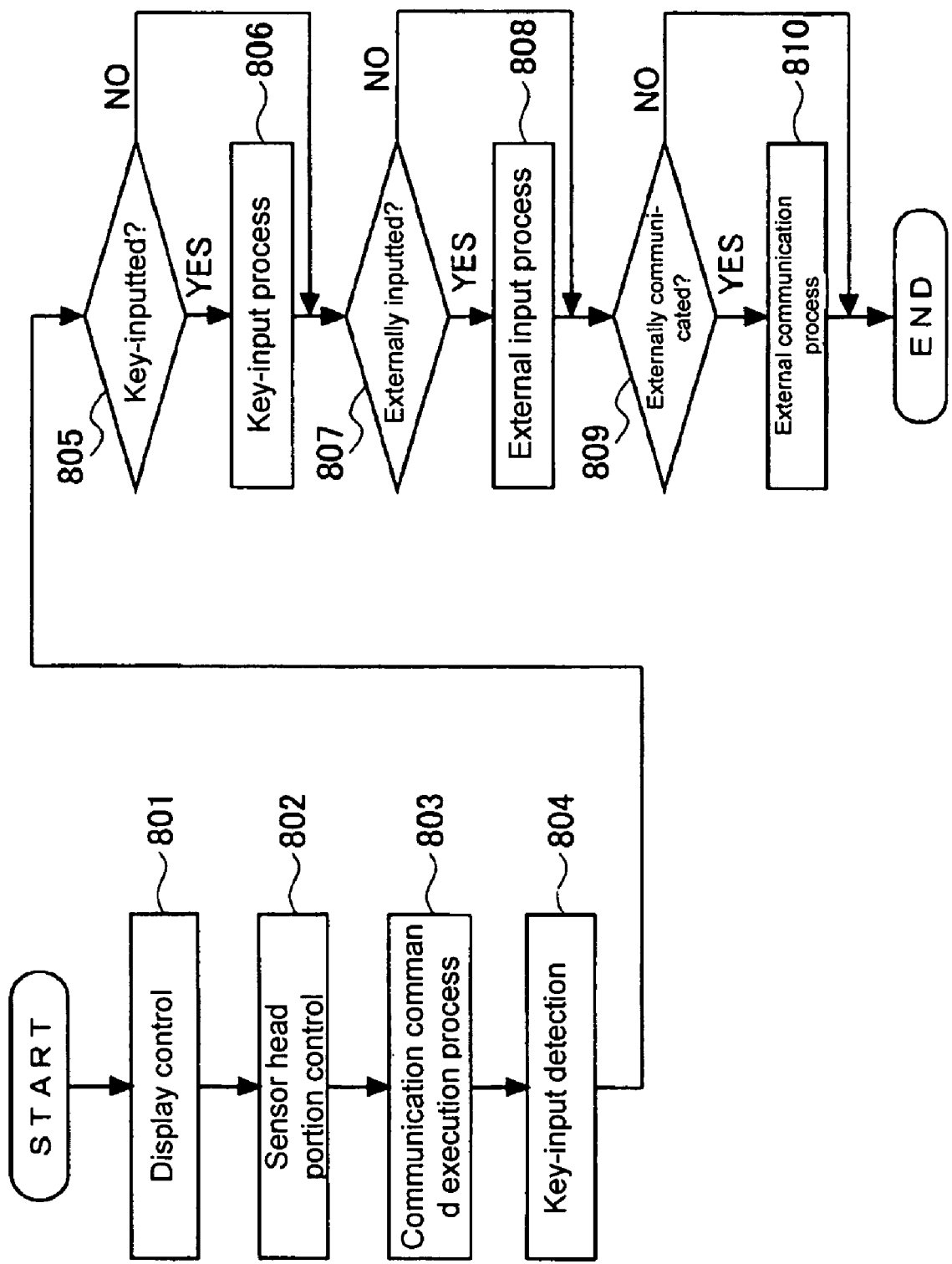
FIG. 8 shows a flowchart specifically representing a RUN mode process.

FIG. 8 shows a flowchart specifically representing the RUN mode process (Step 610). In the RUN mode process, a process for controlling a display of the display portion 15 (Step 801), a process for controlling the sensor head portion (Step 802), and a process for executing a communication command from the external equipment are sequentially executed. Whether there has been a key-input or not (operation of the operating portion under the operating-portion cover 14) is confirmed (Step 804), and when a prescribed key-input is detected (Step 805: YES), a key-input process is executed (Step 806) according to the detection. Subsequently, whether there has been an external input through the communication portion 105 or not is confirmed (Step 807), and when a prescribed external input is detected (Step 807: YES), an external input process is executed according to the detection. Thereafter, whether there has been external communication through the communication portion 105 or not is confirmed (Step 809), and when prescribed external communication is detected (Step 809: YES), an external communication process is executed according to the detection (Step 810).

The displacement sensor device of the present embodiment is provided with an automatically following measurement mode as one example of the process for controlling the sensor head portion (Step 802) of the RUN mode. Further, the displacement sensor of the present embodiment is assumed to be used such that a plurality of objects to be measured are conveyed along a line, and the sensor head portion 2 of the displacement sensor irradiates the objects to be measured with slit light in a vertical direction to the direction of conveying the objects to be measured and then receives the light reflected by the objects to be measured. In the following, this automatically following measurement mode is specifically described.

Figure 9:
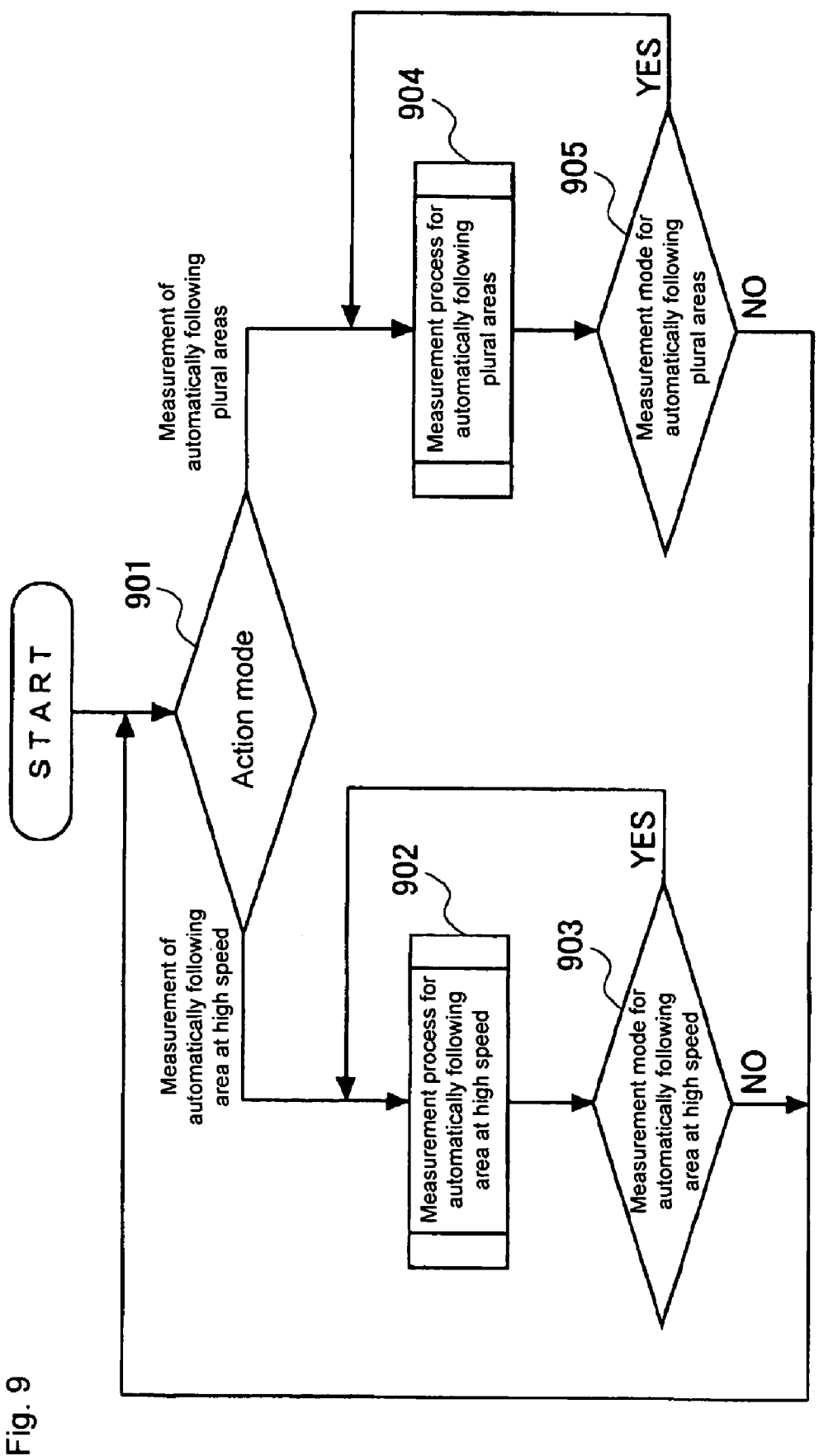
FIG. 9 shows a general flowchart representing a process of an automatically following measurement mode.

FIG. 9 shows a general flowchart representing the process of the automatically following measurement mode. When the process is started, the mode setting is read, to determine whether the action mode is a measurement mode for automatically following an area at high speed or a measurement mode for automatically following plural areas (Step 901).

When the action mode is the measurement mode for automatically following an area at high speed, an after-mentioned measurement process for automatically following an area at high speed is performed (Step 902). Following Step 902, it is determined whether the measurement mode for automatically following an area at high speed is continuing or not (Step 903). Namely, when this mode is switched to another set mode, the process is returned to Step 901, whereas when it is not switched, the process is returned to Step 902.

When the action mode is the measurement mode for automatically following plural areas, an after-mentioned measurement process for automatically following plural areas is performed (Step 904). Following Step 904, it is determined whether the measurement mode for automatically following plural areas is continuing or not (Step 905). Namely, when this mode is switched to another set mode, the process is returned to Step 901, whereas when it is not switched, the process is returned to Step 904.

Figure 10:
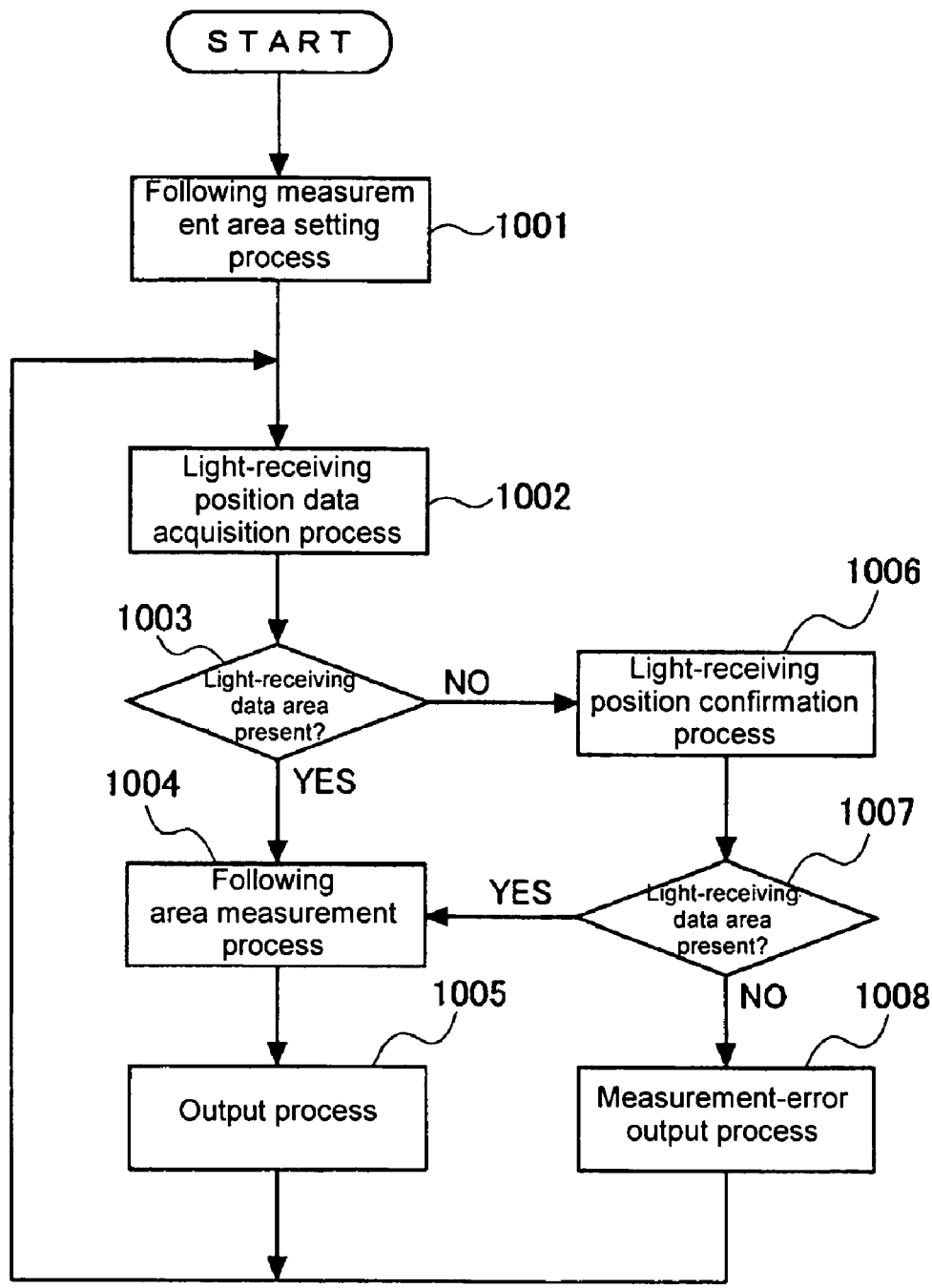
FIG. 10 shows a flowchart specifically representing a measurement process for automatically following an area at high speed.
Figure 14:
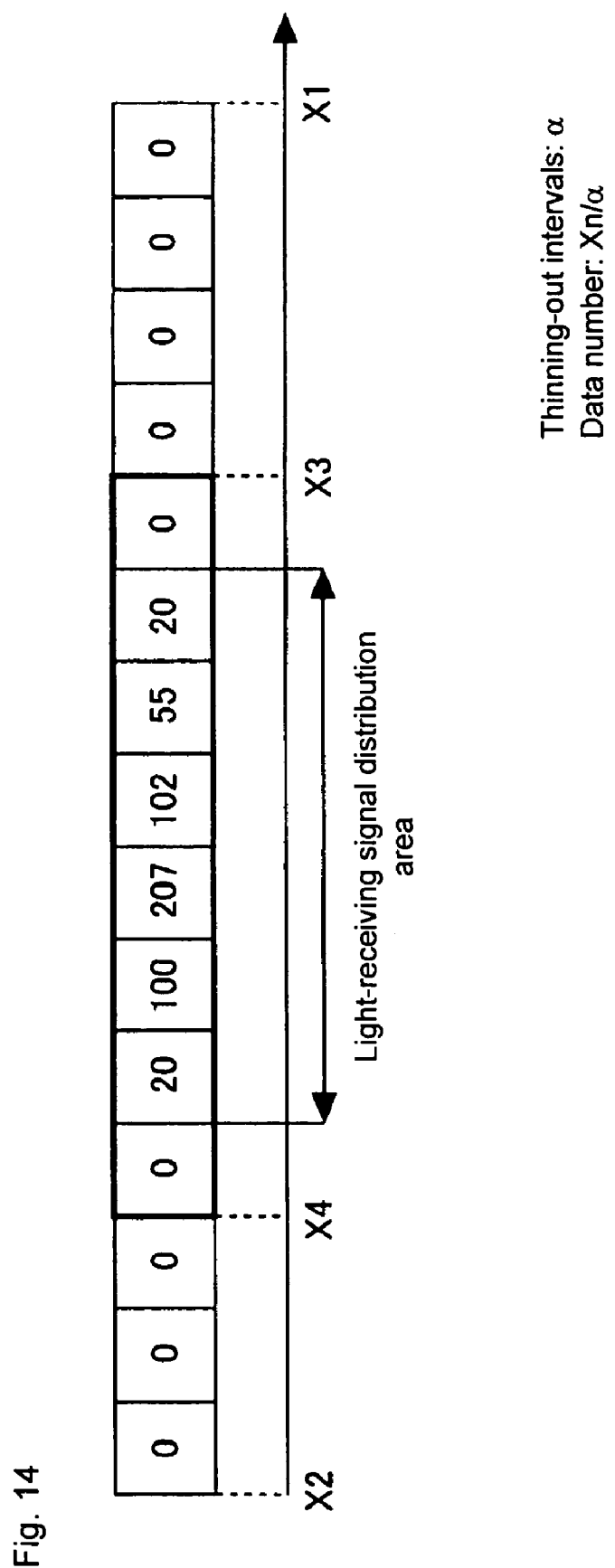
FIG. 14 shows a concentration distribution of thinning-out data (horizontal line data).
Figure 15:
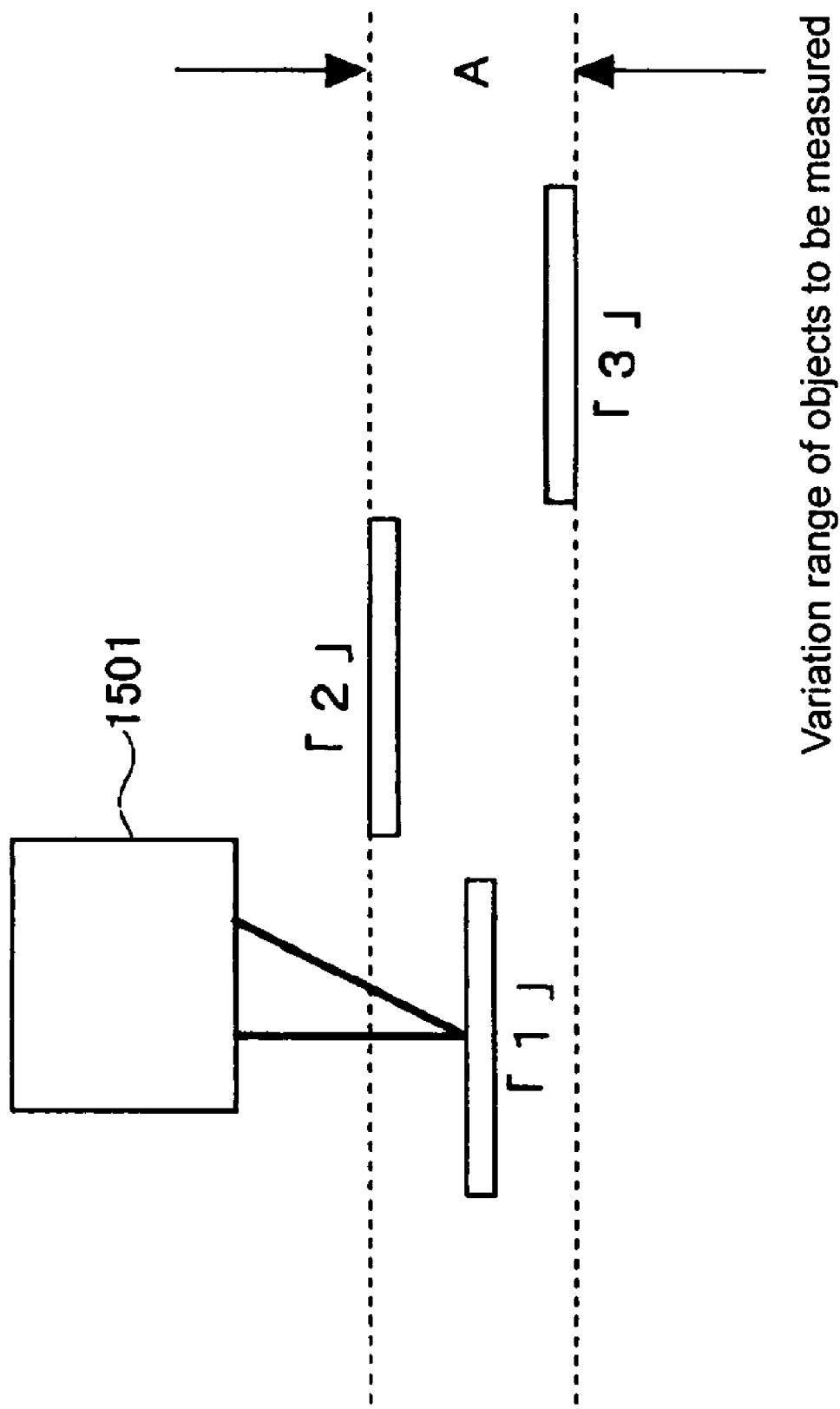
FIG. 15 shows a view (No. 1) for describing a problem of a conventional technique.
Figure 16:
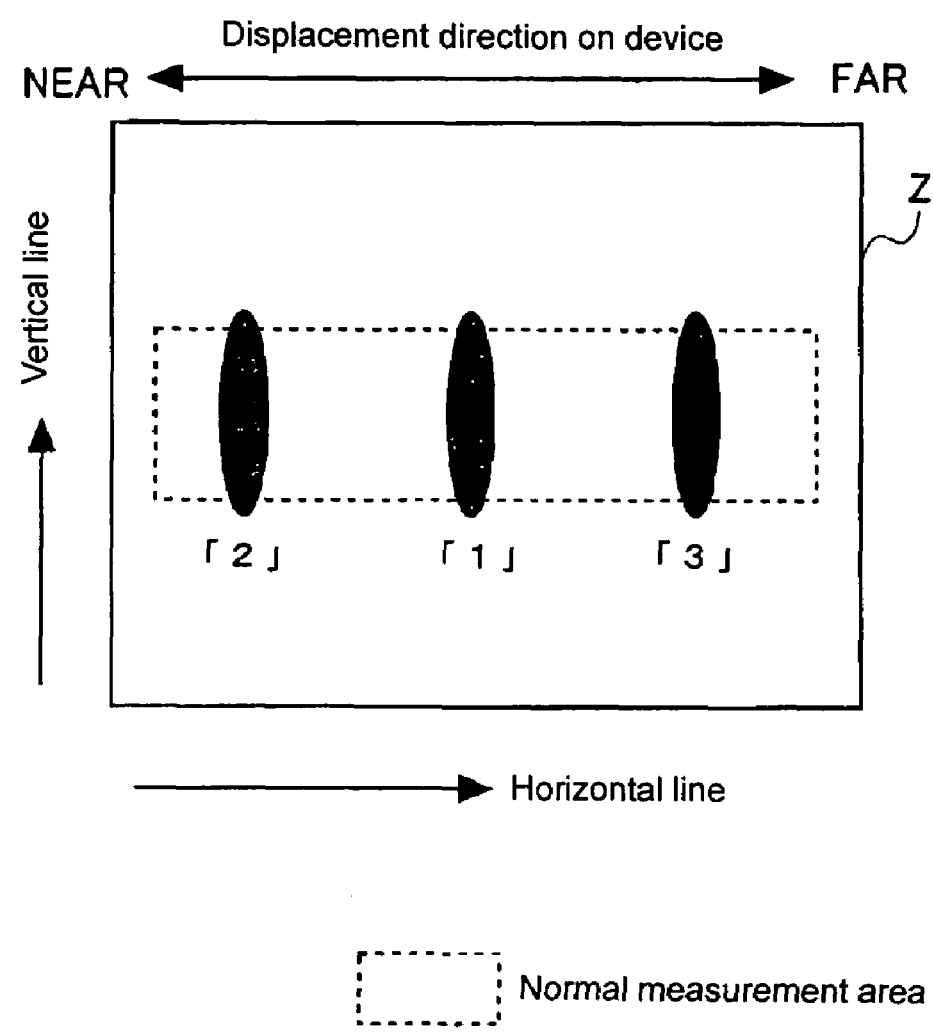
FIG. 16 shows a view (No. 2) for describing the problem of the conventional technique.

The measurement process for automatically following an area at high speed is described by reference to a flowchart shown in FIG. 10, and explanatory views shown in FIGS. 12 and 14. When the process shown in FIG. 10 is started, a process for setting a measurement area (normal measurement area) for following is executed (Step 1001).

Figure 12:
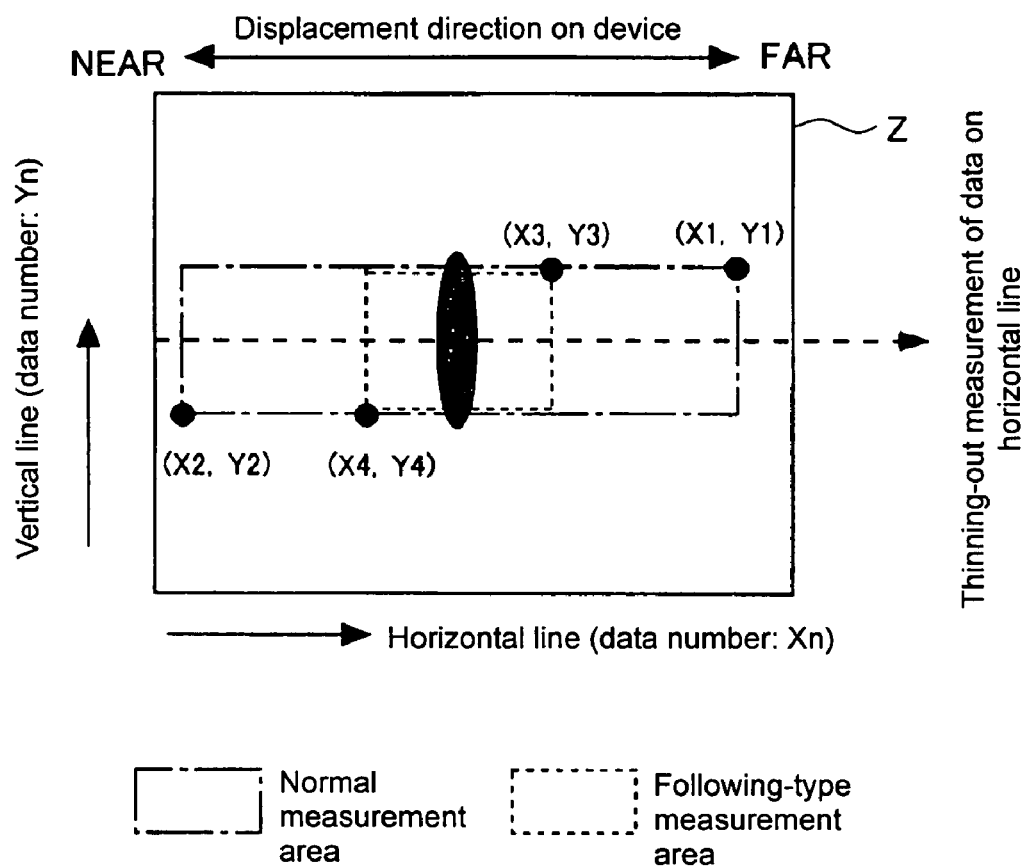
FIG. 12 shows an explanatory view of the measurement mode for automatically following an area at high speed.

Herein, "Z" shown in FIG. 12 represents a rectangular viewing field (light-receiving face) of the two-dimensional image pickup element provided in the light-receiving portion 203. In the figure, the left side is closer, whereas the right side is farther, to the sensor head portion 2. Further, while a horizontal line X (in a displacement measuring direction: data number Xn) has been set along the longitudinal direction of the rectangular visual field Z, a vertical line Y (in an extending direction of the irradiated-light images: data number Yn) orthogonal to the set horizontal line has been allocated. A rectangular measurement area, surrounded with a broken line with the opposing end points: a coordinate position (X1, Y1) and a coordinate position (X2, Y2), is set as a normal measurement area in Step 1001. It is to be noted that the normal measurement area has been previously stored in the storage portion 205 of the sensor head portion 2.

Subsequently to Step 1001, a process for acquiring light-receiving position data is executed (Step 1002). Herein, in the normal measurement area set in Step 1001, a thinning-out measurement of data along the horizontal line X is performed, to acquire a prescribed concentration distribution (luminance distribution). Herein, for example, data on one line at the center of the horizontal lines in the normal measurement area are measured while being thinned out in the displacement measuring direction.

Thereafter, the presence or absence of a light-receiving data area is determined (Step 1003). When the light-receiving area is present (when an irradiated-light image is in the normal measurement area), a following area measurement process is performed where the following-type measurement area is set to measure a target displacement (Step 1004). FIG. 14 shows a concentration distribution (luminance distribution) acquired when the thinning-out measurement of data is performed at thinning-out intervals α along one line of the horizontal lines X in the normal measurement area set in Step 1001. An area where light-receiving signals of the irradiated-light images are distributed can be acquired by this concentration distribution, and as a distribution area in the horizontal line direction, an area X3 to X4 is set so as to include the light-receiving signal distribution area. Further, as shown in FIG. 12, a rectangular measurement area, surrounded with a broken line with the opposing end points: a coordinate position (X3, Y3) and a coordinate position (X4, Y4), is set as a following type measurement area. A detailed measurement process is executed across all the lines in this following-type measurement area, and target measurement results (e.g. displacement, sensitivity, peak value, etc.) are outputted (Step 1005). Following Step 1005, the process is returned to Step 1002.

On the other hand, when no light-receiving data area is present (when no irradiated-light image is present in the normal measurement area), a process for confirming a light-receiving position is executed (Step 1006). Herein, a measurement area is set other than the normal measurement area which is in the visual field of the two-dimensional image pickup element and was set in Step 1001. Subsequently, a process for acquiring light-receiving position data is executed, and the presence or absence of the light-receiving data area is again determined (Step 1007). Herein, when the light-receiving data area is present, the process is returned to above Step 1004, whereas when no light-receiving data area is present, a measurement-error output is executed (Step 1008), and then process is returned to Step 1002.

As thus described, in the displacement sensor of the present embodiment, the sensor head portion shown in FIG. 3 cooperates with the signal processing portion shown in FIG. 1 so that the normal measurement area and the following-type measurement area which is narrower than the normal measurement area are set in the visual field of the two-dimensional image pickup element. Based upon an image shot in the two-dimensional image pickup element, the following-type measurement area is measured for measuring a target displacement.

It is to be noted that, when a one-dimensional image pickup element is used, since no vertical line is present and only one horizontal line is present from the beginning, "Y" may all be replaced with Y1. The normal measurement area has the opposing end points: a coordinate position (X1, Y1) and a coordinate position (X2, Y1), and is a line shape. This can also apply to a following-type measurement area in this case.

Although only one following-type measurement area is set in the above embodiment, two or more following-type measurement areas may be set. Further, they may be set in the horizontal line direction X and/or the vertical line direction Y. It is assumed that, as an example of such a case, two following-type measurement areas are set, and then a thickness of a transparent body is measured. For example, a glass plate with its front face exposed while its rear face covered with a metal is often seen. Such a glass plate corresponds to glass plates used for cathode-ray tubes for television sets, glass plates used as liquid crystal display panels, and the like. Since measuring such a glass plate in the sensor head portion 2, the displacement sensor of the present embodiment is capable of executing a process of the measurement mode for automatically following plural areas as one of the automatically following measurement modes.

Figure 11:
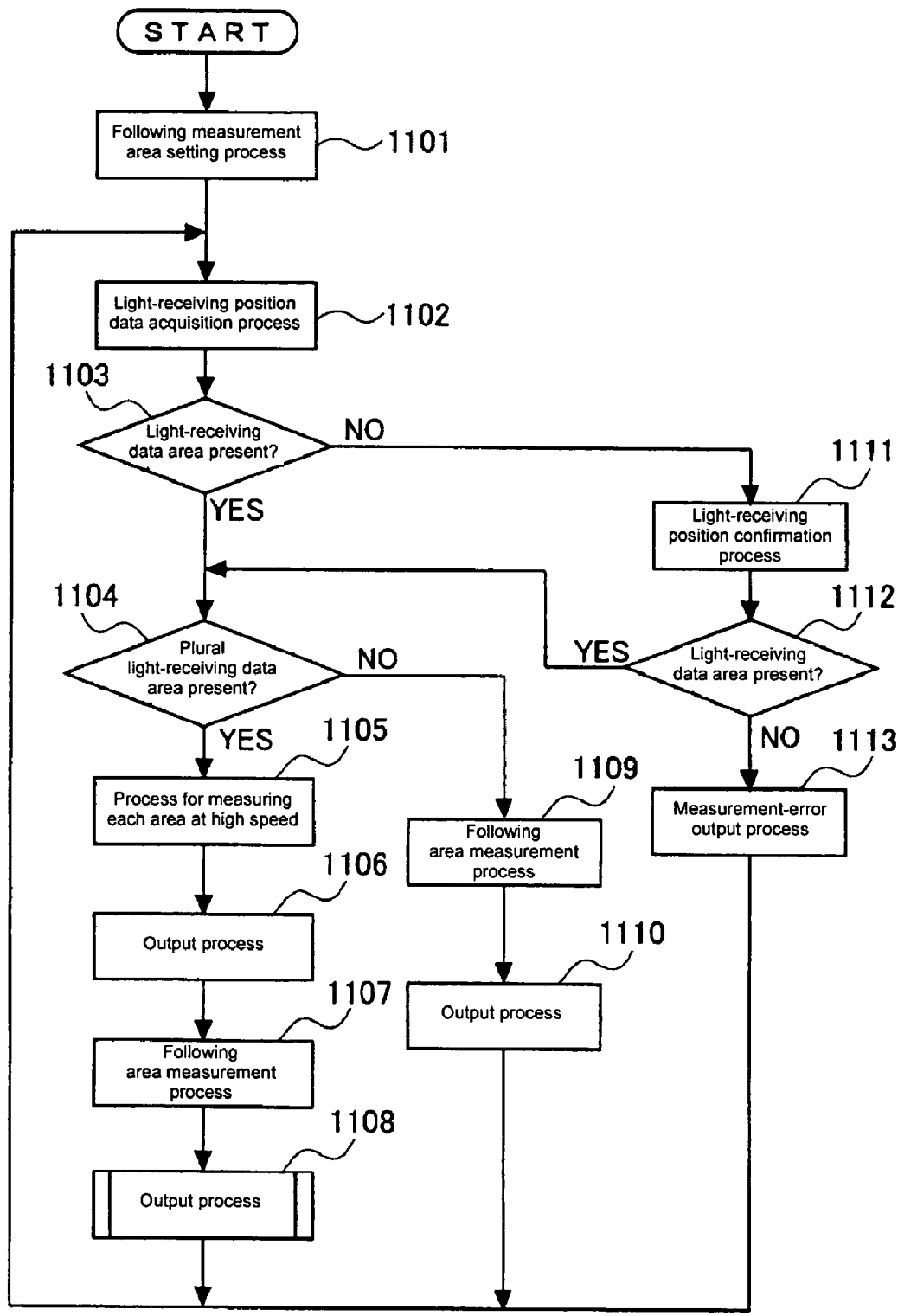
FIG. 11 shows a flowchart specifically representing a measurement process for automatically following plural areas.
Figure 13:
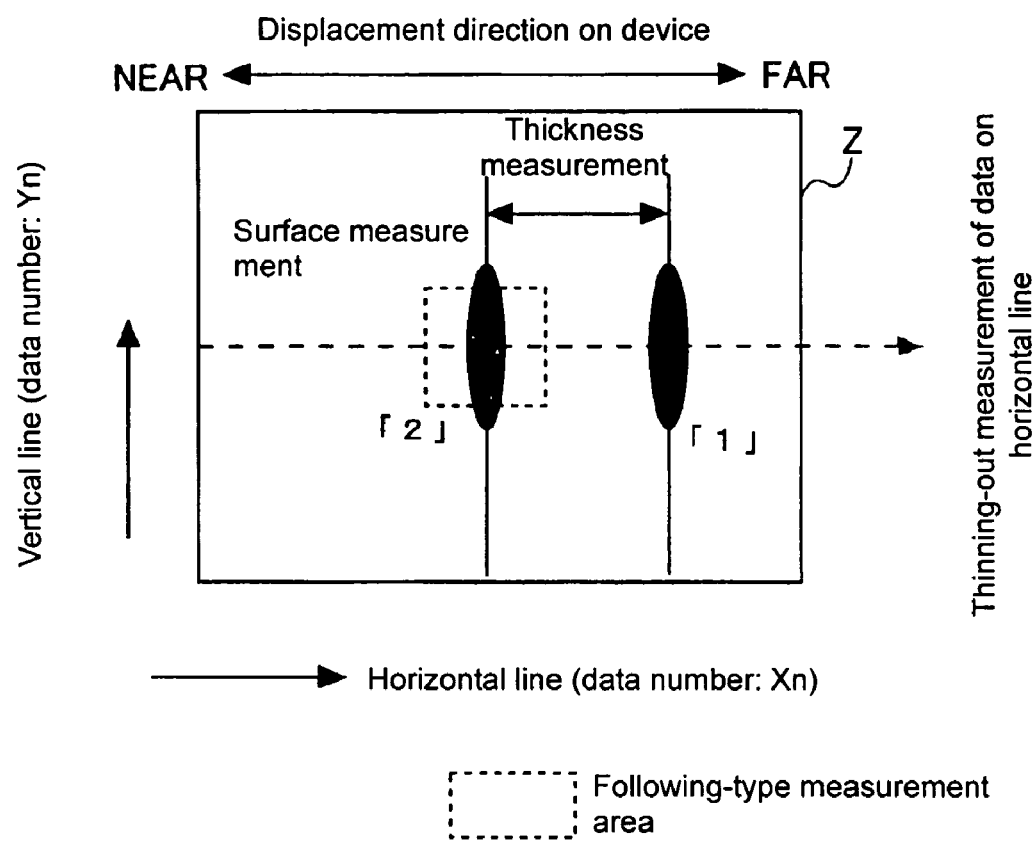
FIG. 13 shows an explanatory view of the measurement mode for automatically following plural areas.

In the following, the measurement process for automatically following plural areas is described by reference to a flowchart shown in FIG. 11 and an explanatory view shown in FIG. 13. When the process shown in FIG. 11 is started, a process for setting a following measurement area is executed (Step 1101) and a normal measurement area is set.

Subsequently to Step 1101, a process for acquiring light-receiving position data is executed (Step 1102). In the measurement area set in Step 1101, for example, data on one line of the horizontal lines X in the measurement area set in Step 1101 are measured while being thinned out in the displacement measuring direction, to acquire a prescribed concentration distribution (luminance distribution).

Thereafter, the presence or absence of a light-receiving data area is determined (Step 1103). When the light-receiving data area is present, the presence or absence of a plurality of light-receiving data areas is determined (Step 1104). When a plurality of light-receiving data areas are present, a high-speed measurement process is executed in each area (area having irradiated-light images) (Step 1105). Namely, a thinning-out measurement is executed over data arranged at prescribed intervals in the displacement measuring direction. FIG. 13 shows an example of the case where a plurality of light-receiving data areas are present, to represent the above-mentioned state. As shown in FIG. 13, in the rectangular visual field Z, a rear face irradiated-light image 1 and a front face irradiated-light image 2 are present corresponding respectively to the front and rear faces of the glass plate. The interval between the center line of the rear face irradiated-light image 1 and the center line of the front face irradiated-light image 2 is measured as the thickness of the glass plate, and the measurement result is outputted (Step 1106).

Following Step 1106, following-type measurement areas are set corresponding respectively to the rear face irradiated-light image 1 and the front face irradiated-light image 2. A detailed measurement process is executed across all the lines in the following-type measurement areas (Step 1107), and target measurement results (e.g. displacement, sensitivity, peak value, etc.) are outputted (Step 1108). Following Step 1108, the process is returned to Step 1102.

It is to be noted that in Step 1104, when the light-receiving data area is not plural, a following area measurement process for measuring one following-type measurement area to be set according to one light-receiving data area is executed (Step 1109), and the measurement results are outputted (Step 1110).

Further, in Step 1103, when no light-receiving data area is present, a measurement area is set other than the normal measurement area set in Step 1101, and a process for confirming a light-receiving position is executed for acquiring a light-receiving position data (Step 1111). Subsequently, the presence or absence of the light-receiving data area is determined (Step 1112). When the light-receiving data area is present, the process is returned to Step 1104, whereas when no light-receiving data area is present, a measurement-error output is executed (Step 1113), and then process is returned to Step 1102.

According to the above embodiment, even when the glass plate, whose thickness is the object to be measured, is displaced to the side closer/farther to the sensor head portion 2, a measurement area may be allowed to follow the glass plate in the displacement direction so as to prevent the sensor device from becoming impossible to perform measurement.

Further, it goes without saying that even with the use of a one-dimensional image pickup element, the same achievement is possible by the same replacement as above described.

As thus described, according to the displacement sensor of the present embodiment, the position of the irradiated-light image is detected from the distribution of light-receiving signals in the normal measurement area, and based upon the detected results, the following-type measurement area is set which includes the irradiated-light image and is narrower than the normal measurement area. A target displacement is measured with the area to be measured restricted to the following-type measurement area. Therefore, for example, even when positions of objects to be measured vary on a line, data is fetched from not all but part of the measurement area according to the positional variations, as an area necessary for measurement. Accordingly, as compared to the conventional technique, the time required for reading out or processing data is short due to the small measurement area, thereby making it possible to speed up sensor response.

What is claimed is:

1. A sensor device, comprising:
   a light-transmitting element for irradiating an object to be measured with light at a prescribed angle;
   an image pickup element for receiving the light to be measured at another angle;
   a normal measurement area setting device capable of setting a normal measurement area in a visual field of the image pickup element;
   an irradiated-light image position detecting device for detecting a position of a light-irradiated image in the visual field of the image pickup element by scanning the normal measurement area;
   a following-type measurement area setting device for setting at least one following-type measurement area which includes a position of the detected irradiated-light image, and is narrower than the normal measurement area in a displacement measuring direction;
   a displacement measuring device for measuring a target displacement by scanning the following-type measurement area; and
   an output device for outputting the target displacement.

2. The sensor device according to claim 1, wherein
   the irradiated-light image position detecting device performs a thinning-out measurement of data arranged at prescribed intervals in a direction of measuring a displacement of the image pickup element, to measure a concentration distribution light-receiving signals in the visual field of the image pickup element, thereby detecting the position of the irradiated-light image based upon the measured concentration distribution.

3. The sensor device according to claim 1, wherein
   the light-transmitting element irradiates slit light,
   the image pickup element is a two-dimensional image pickup element, and
   the irradiated-light image position detecting device measures a concentration distribution of the light-receiving signals on at least one line in the displacement measuring direction in the visual field of the image pickup element, thereby detecting a position of the irradiated-light image based upon the measured concentration distribution.

4. The sensor device according to claim 3, wherein
   either an all-line measurement is performed of all data arranged in the displacement measuring direction in the measurement area, or a thinning-out measurement is performed of data arranged at prescribed intervals in the displacement measuring direction, thereby measuring the concentration distribution.

5. The sensor device according to claim 1, wherein
   the irradiated-light image position detecting device performs either an all-line measurement or a thinning-out measurement of a concentration distribution of the light-receiving element signals in the displacement measuring direction in an area other than the normal measurement in the visual field of the image pickup element when an irradiated-light image is not detected in the normal measurement area.

6. The sensor device according to claim 1, wherein the light-transmitting element irradiates slit light,
   the image pickup element is a two-dimensional image pickup element, and
   the irradiated-light image position detecting device performs either an all-line measurement or a thinning-out measurement of a concentration distribution of the light-receiving element signals on at least one line in the displacement measuring direction in an area other than the normal measurement in the visual field of the two-dimensional image pickup element when an irradiated-light image is not detected in the normal measurement area.

7. The sensor device according to claim 1, wherein the object to be measured is a transparent body, two following-type measurement areas are provided corresponding to a front face and rear face of the transparent body, and measurement is performed while the two following-type areas are switched to one another.

8. The sensor device according to claim 7, wherein a thinning-out measurement is performed of data arranged at prescribed intervals in the displacement measuring direction, connecting irradiated-light images arranged on the two following-type measurement areas, thereby measuring a thickness of the transparent body.

9. The sensor device according to claim 1, wherein
the image pickup element is constituted of a CMOS image pickup element, and
the irradiated-light image position detecting device is characterized by directly reading out, from the CMOS image pickup element, pixel data of the normal measurement data and following-type measurement area.

10. The sensor device according to claim 1, wherein the sensor device is constituted as a displacement sensor, a length measuring sensor, and an angle sensor.

11. A measurement method, comprising:
irradiating an object to be measured with a light-transmitting element using light at a prescribed angle;
receiving the light to be measured at another angle using an image pickup element;
setting a normal measurement area in the visual field of the image pickup element;
detecting a position of a light-irradiated image in the visual field of the image pickup element by scanning the normal measurement area using an irradiated-light image position detecting device;
setting at least one following-type measurement area which includes the position of the detected irradiated-light image, and is narrower than the normal measurement area in a displacement measuring direction;
measuring a target displacement by scanning the following-type measurement area; and
outputting the measured displacement.

12. The method according to claim 11, further comprising
performing a thinning-out measurement of data arranged at prescribed intervals in a direction of measuring a displacement of the image pickup element, to measure a concentration distribution light-receiving signals in the displacement measuring direction in the visual field of the image pickup element, thereby detecting the position of the irradiated-light image based upon the measured concentration distribution.

13. The method according to claim 11, wherein
the step of irradiating an object is performed using slit light,
the image pickup element comprises a two-dimensional image pickup element, and further comprising the step of:
measuring the concentration distribution of the light-receiving signals on at least one line in the displacement measuring direction in the visual field of the image pickup element, thereby detecting the position of the irradiated-light image based upon the measured concentration distribution.

14. The method according to claim 13, wherein
the step of measuring the concentration distribution comprises performing an all-line measurement of all data arranged in the displacement measuring direction in the measurement area, or a thinning-out measurement of data arranged at prescribed intervals in the displacement measuring direction.

15. The method according to claim 11, further comprising the step of
performing an all-line measurement or a thinning-out measurement of the concentration distribution of the light-receiving element signals in the displacement measuring direction in an area other than the normal measurement in the visual field of the image pickup element when an irradiated-light image is not detected in the normal measurement area.

16. The method according to claim 11,
the step of irradiating an object is performed using slit light,
the image pickup element comprises a two-dimensional image pickup element, and further comprising the step of:
performing an all-line measurement or a thinning-out measurement of the concentration distribution of the light-receiving element signals in the displacement measuring direction in an area other than the normal measurement in the visual field of the image pickup element when an irradiated-light image is not detected in the normal measurement area.

17. The method according to claim 11, wherein the object to be measured is a transparent body, two following-type measurement areas are provided corresponding to the front face and rear face of the transparent body, and the step of measuring a target displacement occurs while the two following-type areas are switched to one another.

18. The method according to claim 17, comprising performing a thinning-out measurement of data arranged at prescribed intervals in the displacement measuring direction, connecting irradiated-light images arranged on the two following-type measurement area, thereby measuring a thickness of the transparent body.

19. The method according to claim 11, wherein
the image pickup element is constituted of a CMOS image pickup element, and
the irradiated-light image position detecting device is characterized by directly reading out, from the CMOS image pickup element, pixel data of the set normal measurement data and following-type measurement area.

20. The method according to claim 11, wherein the method is at least in part performed by a sensor device that is constituted as a displacement sensor, a length measuring sensor, and an angle sensor.

* * * * *